United States Patent
Kimoto et al.

(10) Patent No.: US 10,267,267 B2
(45) Date of Patent: Apr. 23, 2019

(54) EVAPORATED FUEL PROCESSING DEVICE

(71) Applicant: AISAN KOGYO KABUSHIKI KAISHA, Obu-shi, Aichi-ken (JP)

(72) Inventors: Junya Kimoto, Obu (JP); Yoshikazu Miyabe, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 0 days.

(21) Appl. No.: 15/507,789

(22) PCT Filed: Aug. 27, 2015

(86) PCT No.: PCT/JP2015/074147
§ 371 (c)(1),
(2) Date: Mar. 1, 2017

(87) PCT Pub. No.: WO2016/035656
PCT Pub. Date: Mar. 10, 2016

(65) Prior Publication Data
US 2017/0305266 A1    Oct. 26, 2017

(30) Foreign Application Priority Data

Sep. 1, 2014   (JP) ................................. 2014-176954

(51) Int. Cl.
*F02M 25/08*    (2006.01)
*B60K 15/035*   (2006.01)
*B60K 15/03*    (2006.01)

(52) U.S. Cl.
CPC ....... *F02M 25/08* (2013.01); *B60K 15/03519* (2013.01); *F02M 25/089* (2013.01);
(Continued)

(58) Field of Classification Search
CPC .. F02M 25/08–25/089; F02D 41/003–41/0045
(Continued)

(56) References Cited

U.S. PATENT DOCUMENTS

| 7,040,302 B2 | 5/2006 | Yamaguchi et al. |
| 8,118,011 B2 | 2/2012 | Hirose |

(Continued)

FOREIGN PATENT DOCUMENTS

| CN | 101605979 A | 12/2009 |
| CN | 103899446 A | 7/2014 |

(Continued)

OTHER PUBLICATIONS

Automotive Electrics and Automotive Electronics, 2007, Robert Bosch GmbH, 5th Edition, p. 276-278.*
(Continued)

*Primary Examiner* — Erick R Solis
*Assistant Examiner* — Robert A Werner
(74) *Attorney, Agent, or Firm* — Conley Rose, P.C.

(57) ABSTRACT

An evaporated fuel processing device includes a flow control valve that is used as a valve to be installed in a pathway connecting a canister and a fuel tank. The device includes an inner pressure sensor configured to detect a pressure in an interior space of the fuel tank as an inner pressure, a valve-opening start position determination means configured to calculate a second order differential value of the inner pressure after a valve opening operation of the flow control valve is started and to determine a valve opening position of the flow control valve as a valve-opening start position when the second order differential value is equal to or greater than a first predetermined value, and a learning means configured to store the valve-opening start position as a learned value that is used when a valve-opening control of the flow control valve is performed.

8 Claims, 8 Drawing Sheets

(52) U.S. Cl.
CPC . *F02M 25/0836* (2013.01); *B60K 2015/0321* (2013.01); *B60K 2015/03296* (2013.01); *B60K 2015/03302* (2013.01); *B60K 2015/03514* (2013.01)

(58) Field of Classification Search
USPC .................. 123/518–521, 298; 73/114.39
See application file for complete search history.

(56) References Cited

U.S. PATENT DOCUMENTS

| | | | | |
|---|---|---|---|---|
| 9,284,923 | B2* | 3/2016 | Kimoto | ............. F02M 25/0836 |
| 2011/0220071 | A1 | 9/2011 | Horiba et al. | |
| 2013/0174813 | A1* | 7/2013 | Miyata | ................... F02M 25/08 |
| | | | | 123/520 |
| 2013/0253799 | A1* | 9/2013 | Peters | ................ F02M 25/0818 |
| | | | | 701/102 |
| 2015/0075501 | A1* | 3/2015 | Peters | ................ F02M 25/0854 |
| | | | | 123/520 |
| 2016/0355390 | A1* | 12/2016 | Pursifull | ................. F16K 31/02 |

FOREIGN PATENT DOCUMENTS

| | | |
|---|---|---|
| JP | 2005002987 A | 1/2005 |
| JP | 2006-214391 A | 8/2006 |
| JP | 2011-256778 A | 12/2011 |
| JP | 5167023 B2 | 3/2013 |
| JP | 5400669 B2 | 1/2014 |
| JP | 2014-077422 A | 5/2014 |

OTHER PUBLICATIONS

International Patent Application No. PCT/JP2015/074147 International Search Report dated Nov. 24, 2015 (3 pages).
Japanese Office Action dated Nov. 24, 2017, for Japanese Application No. 2016-546595 (4 p.).
English Translation of Japanese Office Action dated Nov. 24, 2017, for Japanese Application No. 2016-546595 (3 p.).
Chinese Patent Application No. 201580045266.0 Office Action dated Jun. 27, 2018 (12 pages).

* cited by examiner

EVAPORATED FUEL PROCESSING DEVICE

CROSS-REFERENCE TO RELATED APPLICATIONS

The present application is a National Phase entry of, and claims priority to, PCT Application No. PCT/JP2015/074147, filed Aug. 27, 2015, which claims priority to Japanese Patent Application No. 2014-176954, filed Sep. 1, 2014, both of which are incorporated herein by reference in their entireties.

STATEMENT REGARDING FEDERALLY SPONSORED RESEARCH OR DEVELOPMENT

Not applicable.

BACKGROUND

The present disclosure relates to an evaporated fuel processing device in which a flow control valve is used as a valve to be installed in a pathway connecting a fuel tank and a canister, and in which the flow control valve is held in a valve-closed condition when a stroke amount corresponding to an axial travel distance of a valve movable element to a valve seat is equal to or less than a predetermined amount from an initial condition, so as to be capable of holding the fuel tank in a hermetically closed condition.

An evaporated fuel processing device using a flow control valve described above as a valve to be installed in a pathway connecting a fuel tank and a canister is taught by Japanese Laid-Open Patent Publication No. 2011-256778. In the flow control valve, a valve movable element needs to be moved in a valve-opening direction by a predetermined amount before the flow control valve reaches a valve-opening start position at which a fuel tank and a canister are communicated with each other after the flow control valve initiates a valve-opening operation from an initial condition. Therefore, in order to quickly perform a valve-opening control of the flow control valve, the valve-opening start position is previously learned, so that the valve-opening control is generally started from the learned valve-opening start position. In order to perform such learning, the valve-opening start position has to be determined. A determination of the valve-opening start position is made by detecting a decrease in an inner pressure of the fuel tank.

BRIEF SUMMARY

However, the inner pressure of the fuel tank varies depending on an environment thereof. Therefore, when the valve-opening start position is determined based on the decrease in the inner pressure, such a valve-opening start position may be incorrectly determined. For example, when a large amount of fuel vapor generate in a space inside the fuel tank, the inner pressure may be increased. As a result, the decrease in the inner pressure may be prevented from being decreased at the valve-opening start position.

In view of such a problem, it is an object of the present disclosure to provide an evaporated fuel processing device in which a flow control valve described above is used as a valve to be attached to a pathway connecting a fuel tank and a canister, and in which a valve-opening start position of the flow control valve at which a fuel tank and a canister are started to be communicated with each other is determined in consideration of a variation of the inner pressure of the fuel tank after the flow control valve initiates a valve-opening operation such that the valve-opening start position may be accurately determined regardless of changes in environment of the fuel tank.

A first aspect of the present disclosure may provide an evaporated fuel processing device configured to adsorb evaporated fuel in a fuel tank to a canister and to feed the adsorbed evaporated fuel to an engine, in which a flow control valve is used as a valve to communicate between a fuel tank and a canister, and in which the flow control valve is held in a valve-closed condition when a stroke amount corresponding to an axial travel distance of a valve movable element to a valve seat is equal to or less than a predetermined amount from an initial condition, so as to be capable of holding the fuel tank in a hermetically closed condition. The device may include an inner pressure sensor configured to detect a pressure in an interior space of the fuel tank as an inner pressure, a valve-opening start position determination means configured to calculate a second order differential value of the inner pressure detected by the inner pressure sensor after a valve opening operation of the flow control valve is started and to determine a valve opening position of the flow control valve as a valve-opening start position when the second order differential value is equal to or greater than a predetermined value, and a learning means configured to store the valve-opening start position determined by the valve-opening start position determination means as a learned value that is used when a valve-opening control of the flow control valve is performed.

According to the first aspect, when the second order differential value is equal to or greater than the predetermined value, the valve opening position of the flow control valve may be determined as the valve-opening start position. Therefore, the valve-opening start position can be accurately detected even if the inner pressure of the fuel tank increases or decreases due to an increase of the evaporated fuel, changes in temperature or other such causes. That is, the valve-opening start position can be more accurately detected compared with a method in which the valve-opening start position is determined by only detecting a decrease in the fuel tank inner pressure.

A second aspect of the present disclosure may provide an evaporated fuel processing device configured to adsorb evaporated fuel in a fuel tank to a canister and to feed the adsorbed evaporated fuel to an engine, in which a flow control valve is used as a valve to communicate between a fuel tank and a canister, and in which the flow control valve is held in a valve-closed condition when a stroke amount corresponding to an axial travel distance of a valve movable element to a valve seat is equal to or less than a predetermined amount from an initial condition, so as to be capable of holding the fuel tank in a hermetically closed condition, which device may include an inner pressure sensor configured to detect a pressure in an interior space of the fuel tank as an inner pressure, a first inner pressure variation calculating means configured to calculate a variation per unit time of the inner pressure that is detected by the inner pressure sensor under a condition in which the flow control valve is closed, a second inner pressure variation calculating means configured to calculate a variation per unit time of the inner pressure that is detected by the inner pressure sensor after a valve opening operation of the flow control valve is started, a valve-opening start position determination means configured to determine a valve opening position of the flow control valve as a valve-opening start position when a difference between the variations respectively calculated by the first inner pressure variation calculating means and the second inner pressure variation calculating means is equal to or greater than a predetermined value, and a learning means configured to store the valve-opening start position determined by the valve-opening start position determination means as a learned value that is used when a valve-opening control of the flow control valve is performed.

According to the second aspect, the valve opening position of the flow control valve may be determined as the valve-opening start position when the difference between the variation per unit time in the inner pressure of the fuel tank under the condition in which the flow control valve is closed and the variation per unit time in the inner pressure of the fuel tank after the valve opening operation of the flow control valve is started is equal to or greater than the predetermined value. Therefore, the valve-opening start position can be accurately determined even if the inner pressure of the fuel tank increases or decreases due to an increase of the evaporated fuel, changes in temperature or other such causes. That is, the valve-opening start position can be more accurately detected compared with a method in which the valve-opening start position is determined by only detecting a decrease in the fuel tank inner pressure.

A third aspect of the present disclosure may provide an evaporated fuel processing device configured to adsorb evaporated fuel in a fuel tank to a canister and to feed the adsorbed evaporated fuel to an engine, in which a flow control valve is used as a valve to communicate between a fuel tank and a canister, and in which the flow control valve is held in a valve-closed condition when a stroke amount corresponding to an axial travel distance of a valve movable element to a valve seat is equal to or less than a predetermined amount from an initial condition, so as to be capable of holding the fuel tank in a hermetically closed condition. The device may include an inner pressure sensor configured to detect a pressure in an interior space of the fuel tank as an inner pressure, a third inner pressure variation calculating means configured to calculate a variation per unit time of the inner pressure that is detected by the inner pressure sensor, a valve-opening start position determination means configured to determine a valve opening position of the flow control valve as a valve-opening start position when a difference between a previous value and a present value of the variation calculated by the third inner pressure variation calculating means is equal to or greater than a predetermined value, and a learning means configured to store the valve-opening start position determined by the valve-opening start position determination means as a learned value that is used when a valve-opening control of the flow control valve is performed.

According to the third aspect, the valve opening position of the flow control valve may be determined as the valve-opening start position when the difference between the previous value and the present value of the variation per unit time in the inner pressure of the fuel tank is equal to or greater than the predetermined value. Therefore, the valve-opening start position can be accurately determined even if the inner pressure of the fuel tank increases or decreases due to an increase of the evaporated fuel, changes in temperature or other such causes. That is, the valve-opening start position can be more accurately detected compared with a method in which the valve-opening start position is determined by only detecting a decrease in the fuel tank inner pressure.

A fourth aspect of the present disclosure may correspond to the second aspect or the third aspect, wherein the valve-opening start position determination means determines the valve opening position of the flow control valve as the valve-opening start position when the variation calculated by the second inner pressure variation calculating means is less than the variation calculated by the first inner pressure variation calculating means by the predetermined value or more under a condition in which the variation calculated by the first inner pressure variation calculating means is increased, or when the present value of the variation calculated by the third inner pressure variation calculating means is less than the previous value by the predetermined value or more under a condition in which the previous value of the variation calculated by the third inner pressure variation calculating means is increased.

A fifth aspect of the present disclosure may correspond to the second aspect or the third aspect, wherein the valve-opening start position determination means determines the valve opening position of the flow control valve as the valve-opening start position when the variation calculated by the second inner pressure variation calculating means is greater than the variation calculated by the first inner pressure variation calculating means by the predetermined value or more under a condition in which the variation calculated by the first inner pressure variation calculating means is reduced, or when the present value of the variation calculated by the third inner pressure variation calculating means is greater than the previous value by the predetermined value or more under a condition in which the previous value of the variation calculated by the third inner pressure variation calculating means is reduced.

A sixth aspect of the present disclosure may correspond to the second aspect, wherein when the variation calculated by the first inner pressure variation calculating means is less than a reference value for evaluating as to whether the inner pressure is in a stable condition or not and an evaluation that the inner tank pressure is in the stable condition is made, the valve-opening start position determination means determines the valve-opening start position based on whether the variation per unit time of the inner pressure detected by the inner pressure sensor is equal to or greater than the predetermined value or not.

When the flow control valve reaches the valve-opening start position after the valve opening operation thereof is started, and as a consequence, the fuel tank and the canister are communicated with each other, the evaporated fuel is supplied to the engine. At that time, an air-fuel ratio of the engine can be instantaneously changed due to the evaporated fuel. The valve-opening start position of the flow control valve can be determined by detecting such changes of the air-fuel ratio. In the present disclosure, the valve-opening start position of the flow control valve is determined based on changes of the inner pressure of the fuel tank detected by the inner pressure sensor. However, when the changes of the air-fuel ratio are additionally used in order to determine the valve-opening start position, the valve-opening start position may be more accurately determined. Further, instead of the changes of the air-fuel ratio, changes of a feedback correction value of the air-fuel ratio used in control of the air-fuel ratio of the engine may be detected and additionally used in order to determine the valve-opening start position.

DETAILED DESCRIPTION

Figure 1:
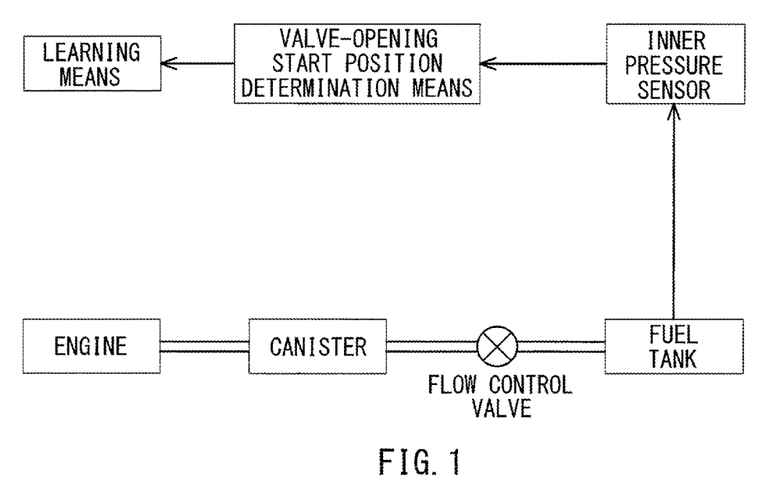
FIG. 1 is a conceptual diagram corresponding to a first aspect in the present disclosure.
Figure 2:
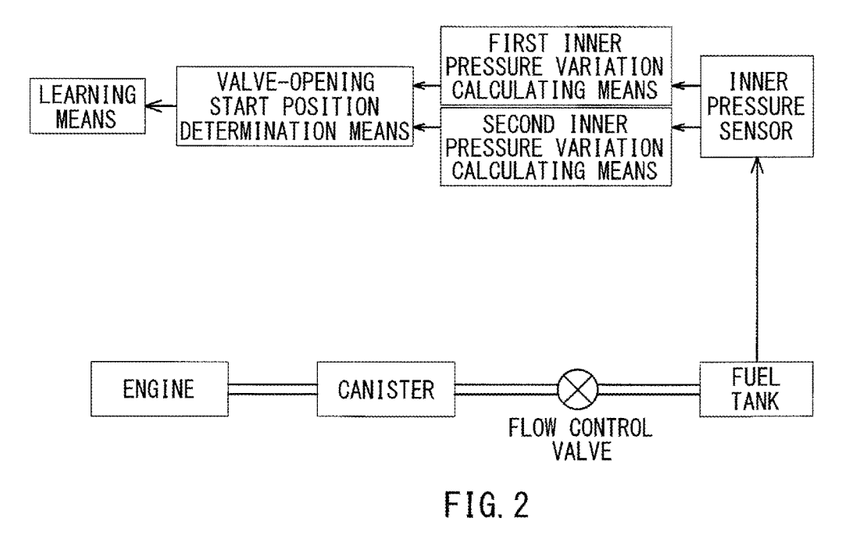
FIG. 2 is a conceptual diagram corresponding to a second aspect in the present disclosure.
Figure 3:
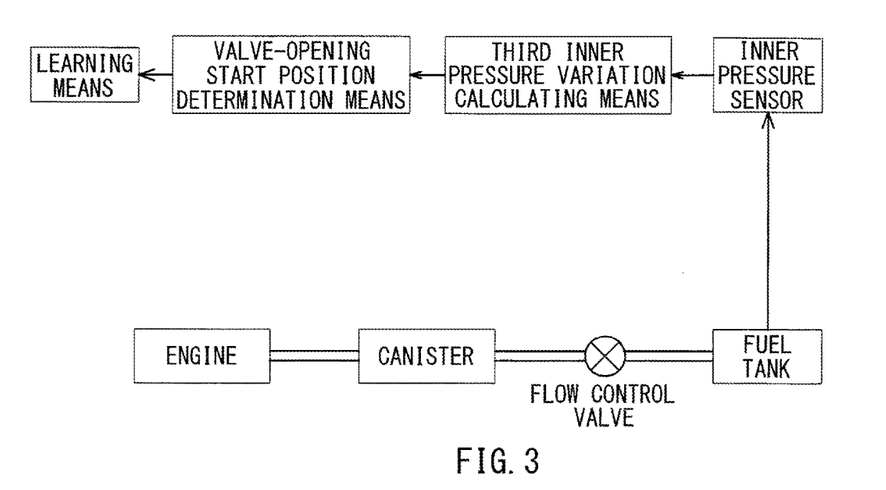
FIG. 3 is a conceptual diagram corresponding to a third aspect in the present disclosure.

FIGS. 1 to 3 are respectively conceptual diagrams corresponding to a first aspect to a third aspect of the present disclosure. Further, a description thereof may be omitted to avoid a repetition.

Figure 4:
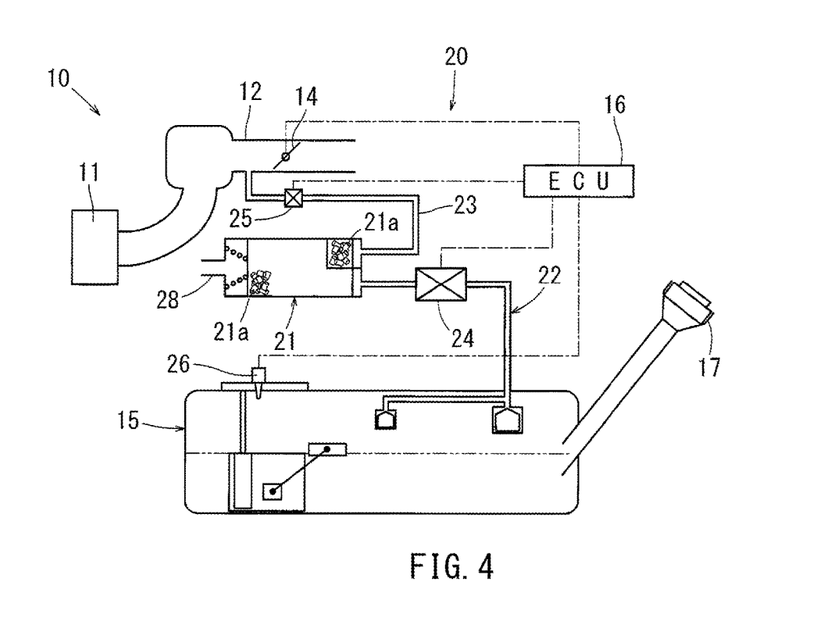
FIG. 4 is a structural diagram of a system according to a first embodiment of the present disclosure.

FIGS. 4 to 8 show a first embodiment of the present disclosure. As shown in FIG. 4, in the embodiment, an evaporated fuel processing device 20 is attached to an engine system 10 of a vehicle.

In FIG. 4, the engine system 10 is a known engine system in which an air-fuel mixture is fed into an engine body 11 via an intake passage 12. Air may be fed into the intake passage 12 via a throttle valve 14 while a flow rate thereof is controlled. Fuel may be fed into the intake passage 12 via a fuel injection valve (not shown) while a flow rate thereof is controlled. The throttle valve 14 and the fuel injection valve may respectively be connected to a control unit (ECU) 16. The throttle valve 14 may be configured to send signals representing opening degrees of the throttle valve 14 to the control unit 16. The fuel injection valve may be configured such that a valve-opening time thereof can be controlled by the control unit 16. Further, the fuel may be fed into the fuel injection valve from a fuel tank 15.

The evaporated fuel processing device 20 may contain a canister 21 that functions to adsorb fuel vapor (which will be hereinafter referred to as "evaporated fuel") generated while filling or generated by fuel vaporization in the fuel tank 15 through a vapor conduit 22. Further, the evaporated fuel adsorbed on the canister 21 may be fed into the intake passage 12 positioned downstream of the throttle valve 14 via a purge conduit 23. A stepping motor driven closing valve (which corresponds to a flow control valve of the present disclosure and may be hereinafter simply referred to as a closing valve) 24 may be attached to the vapor conduit 22 so as to open and close the vapor conduit 22. Conversely, a purge valve 25 may be attached to the purge conduit 23 so as to open and close the purge conduit 23.

The closing valve 24 may be held in a valve-closed condition when a stroke amount corresponding to an axial travel distance of a valve movable element to a valve seat is equal to or less than a predetermined amount from an initial condition after a valve-opening operation of the closing valve 24 is initiated by a stepping motor, so as to be capable of holding the fuel tank 15 in a hermetically closed condition. Further, the stroke amount may be configured to be continuously varied. When the stroke amount is varied beyond the predetermined amount, the closing valve 24 may be changed to a valve-opened condition, so that the fuel tank 15 and the canister 21 may be communicated with each other. A position of the valve element at the time that the stroke amount exceeds the predetermined amount may correspond to a valve-opening start position in the present disclosure.

The canister 21 may be filled with activated carbon 21a as an adsorbent, so that the evaporated fuel introduced into the canister 21 through the vapor conduit 22 can be adsorbed by the activated carbon 21a. The adsorbed evaporated fuel can then be released into the purge conduit 23. The canister 21 may be communicated with an atmospheric conduit 28 open to the atmosphere. Therefore, when an intake negative pressure is applied to the canister 21 via the purge conduit 23, the atmospheric pressure can be fed to the canister 21 via the atmospheric conduit 28, so that the adsorbed evaporated fuel can be purged via the purge conduit 23. The atmospheric conduit 28 may be arranged such that air in the vicinity of a fuel filler opening 17 communicated with the fuel tank 15 can be aspirated.

Various specific signals necessary to control the valve-opening time of the fuel injection valve or other such factors may be sent to the control unit 16. In addition to the signals representing the opening degrees of the throttle valve 14 described above, detection signals of a pressure sensor (which corresponds to an inner pressure sensor of the present disclosure and will be hereinafter referred to as an inner pressure sensor) 26 for detecting inner pressures of the fuel tank 15 shown in FIG. 4 may be sent to the control unit 16. Further, the control unit 16 may be configured to control opening and closing operations of the closing valve 24 and the purge valve 25 shown in FIG. 4 as well as the valve-opening time of the injection valve described above.

Figure 5:
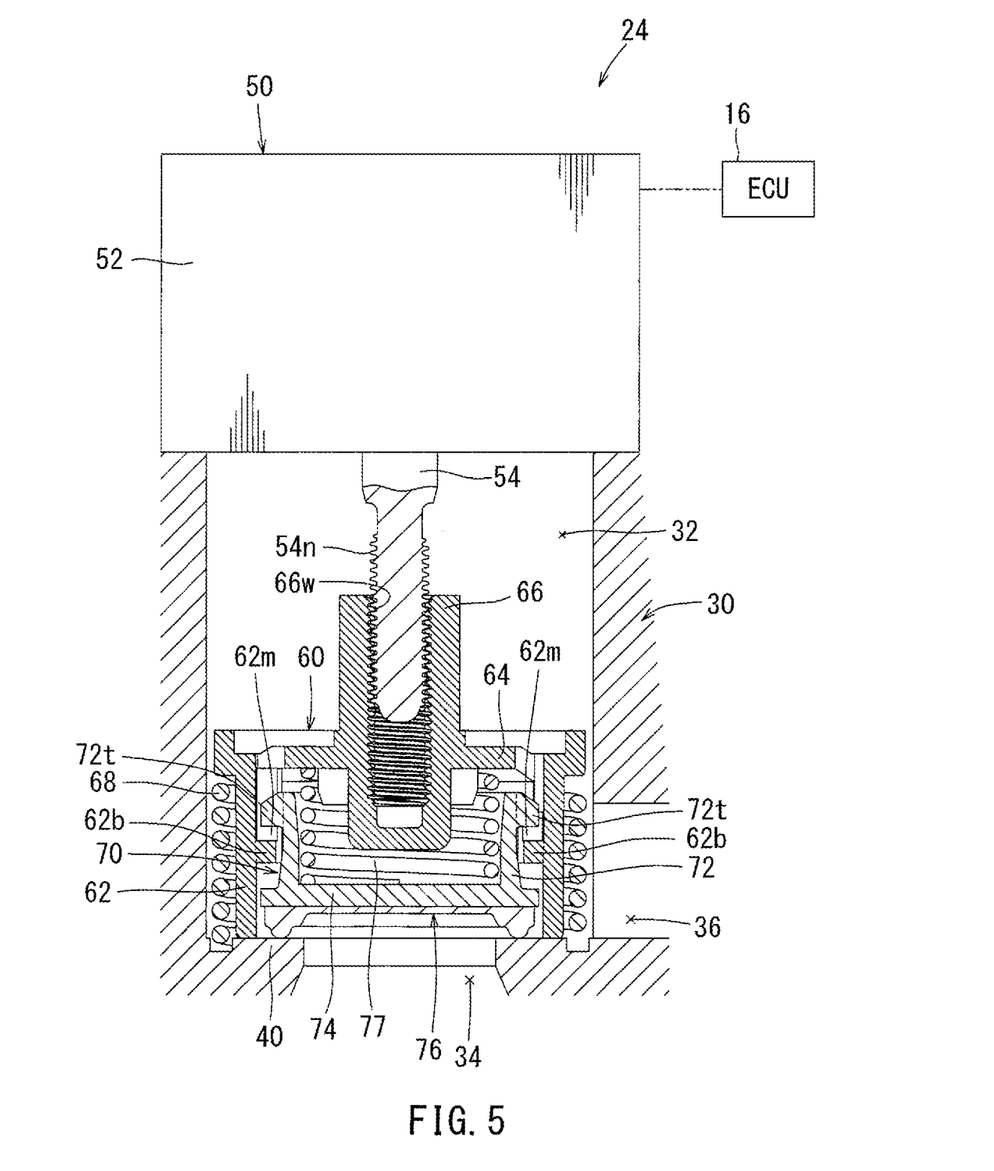
FIG. 5 is a vertical sectional view of a flow control valve used in the above-described first embodiment, which view illustrates an initial condition.

FIG. 5 shows a structure of the closing valve 24. The closing valve 24 may include a substantially circular cylindrical valve guide 60 concentrically positioned in a circular cylindrical valve chest 32 of a valve casing 30 and a substantially circular cylindrical valve body 70 concentrically positioned in the valve guide 60. Conversely, the valve casing 30 may have an inflow passage 34 that is formed in a central portion of a lower end of the valve chest 32 and is communicated with the vapor conduit 22 communicated with the fuel tank 15. Further, the valve casing 30 may have an outflow passage 36 formed in a side wall of the valve chest 32 and communicated with the vapor conduit 22 communicated with the canister 21. Further, a motor body 52 of the stepping motor 50 is attached to an upper end of the valve casing 30 opposite to the lower end in which the inflow passage 34 is formed, so as to close an upper end of the valve chest 32.

The valve guide 60 and the valve body 70 may constitute the valve movable element of the present disclosure. Further, a circular valve seat 40 may be concentrically formed in an inner periphery of the lower end of the valve casing 30 in which the inflow passage 34 is formed. When the valve guide 60 and the valve body 70 contact the valve seat 40, the closing valve 24 may be placed in the valve-closed condition. To the contrary, when the valve guide 60 and the valve body 70 is spaced from the valve seat 40, the closing valve 24 may be placed in the valve-opened condition.

The valve guide 60 may be composed of a circular cylindrical wall portion 62 and an upper wall portion 64 closing an upper end opening of the cylindrical wall portion 62, so as to have a topped circular cylindrical shape. A cylindrical shaft portion 66 may be concentrically formed in a central portion of the upper wall portion 64. The cylindrical shaft portion 66 may have a female thread portion 66w formed in an inner circumferential surface thereof. The female thread portion 66w formed in the cylindrical shaft portion 66 of the valve guide 60 may be threadably connected to a male thread portion 54n formed in an outer circumferential surface of an output shaft 54 of the stepping motor 50. Further, the valve guide 60 may be axially (vertically) movably received in the valve casing 30 while the valve guide 60 may be prevented from revolving via a detent device (not shown). Therefore, upon positive and negative rotation of the output shaft 54 of the stepping motor 50, the valve guide 60 may vertically (axially) move. Further, the valve guide 60 may have a supplemental spring 68 that is circumferentially attached thereto. The supplemental spring 68 may be configured to bias the valve guide 60 upward.

The valve body 70 may be composed of a circular cylindrical wall portion 72 and a lower wall portion 74 closing a lower end opening of the cylindrical wall portion 72, so as to have a bottomed circular cylindrical shape. A sealing member 76 made of a disk-shaped rubber-like elastomeric material may be attached to a lower surface of lower wall portion 74. The sealing member 76 of the valve body 70 may be arranged so as to contact an upper surface of the valve seat 40 of the valve casing 30.

The valve body 70 may have a plurality of connecting projection portions 72t that are circumferentially formed in an upper outer circumferential surface of the circular cylindrical wall portion 72. Conversely, the valve guide 60 may have vertical groove-like connecting recess portions 62m corresponding to the connecting projection portions 72t of the valve body 70. The connecting recess portions 62m may be formed in an inner circumferential surface of the cylindrical wall portion 62 so as to extend in a moving direction of the valve guide 60. Therefore, the connecting projection portions 72t of the valve body 70 may respectively be fitted into the connecting recess portions 62m of the valve guide 60 so as to relatively vertically move therein. Further, in a condition in which bottom wall portions 62b of the connecting recess portions 62m of the valve guide 60 may respectively contact the connecting projection portions 72t of the valve body 70 from below, the valve guide 60 and the valve body 70 may move upward (in a valve-opening direction) in combination. Further, a valve spring 77 may be concentrically received between the upper wall portion 64 of the valve guide 60 and the lower wall portion 74 of the valve body 70. The valve spring 77 may function to normally bias the valve body 70 downward, i.e., in a valve-closing direction, relative to the valve guide 60.

Next, a basic action of the closing valve 24 will be described.

The closing valve 24 may be activated by rotating the stepping motor 50 in the valve-opening direction or the valve-closing direction by a predetermined number of steps based on output signals transmitted from the control unit (ECU) 16. That is, upon rotation of the stepping motor 50 by the predetermined number of steps, the valve guide 60 may vertically move by a predetermined stroke amount due to threadable engagement of the male thread portion 54n formed in the output shaft 54 of the stepping motor 50 and the female thread portion 66w formed in the cylindrical shaft portion 66 of the valve guide 60. For example, the closing valve 24 may be configured such that in a fully opened position, the number of steps and the stroke amount from the initial condition may respectively be about 200 steps and about 5 mm.

As shown in FIG. 5, in an initialized condition (the initial condition) of the closing valve 24, the valve guide 60 may be held in a lower limit position, so that a lower end surface of the cylindrical wall portion 62 of the valve guide 60 may contact the upper surface of the valve seat 40 of the valve casing 30. Further, in this condition, the connecting projection portions 72t of the valve body 70 may be positioned above the bottom wall portions 62b of the valve guide 60 while the sealing member 76 of the valve body 70 may be pressed against the upper surface of the valve seat 40 of the valve casing 30 by a spring force of the valve spring 77. That is, the closing valve 24 may be held in a fully closed condition. At this time, the number of steps of the stepping motor 50 is equal to zero step, and the axial (upward) travel distance of the valve guide 60, i.e., the stroke amount of the valve guide 60 in the valve-opening direction, is equal to zero mm.

When the vehicle is parked, the stepping motor 50 of the closing valve 24 may rotate by, for example, 4 steps from the initialized condition in the valve-opening direction. As a result, the valve guide 60 may move upward by about 0.1 mm due to the threadable engagement of the male thread portion 54n formed in the output shaft 54 of the stepping motor 50 and the female thread portion 66w formed in the cylindrical shaft portion 66 of the valve guide 60, so as to be held in a condition in which it is spaced from the valve seat 40 of the valve casing 30. Thus, an excessive force caused by changes in environment such as temperature can be prevented from being applied between the valve guide 60 and the valve seat 40 of the valve casing 30 of the closing valve 24. Further, in this condition, the sealing member 76 of the valve body 70 may be pressed against the upper surface of the valve seat 40 of the valve casing 30 by the spring force of the valve spring 77.

Figure 6:
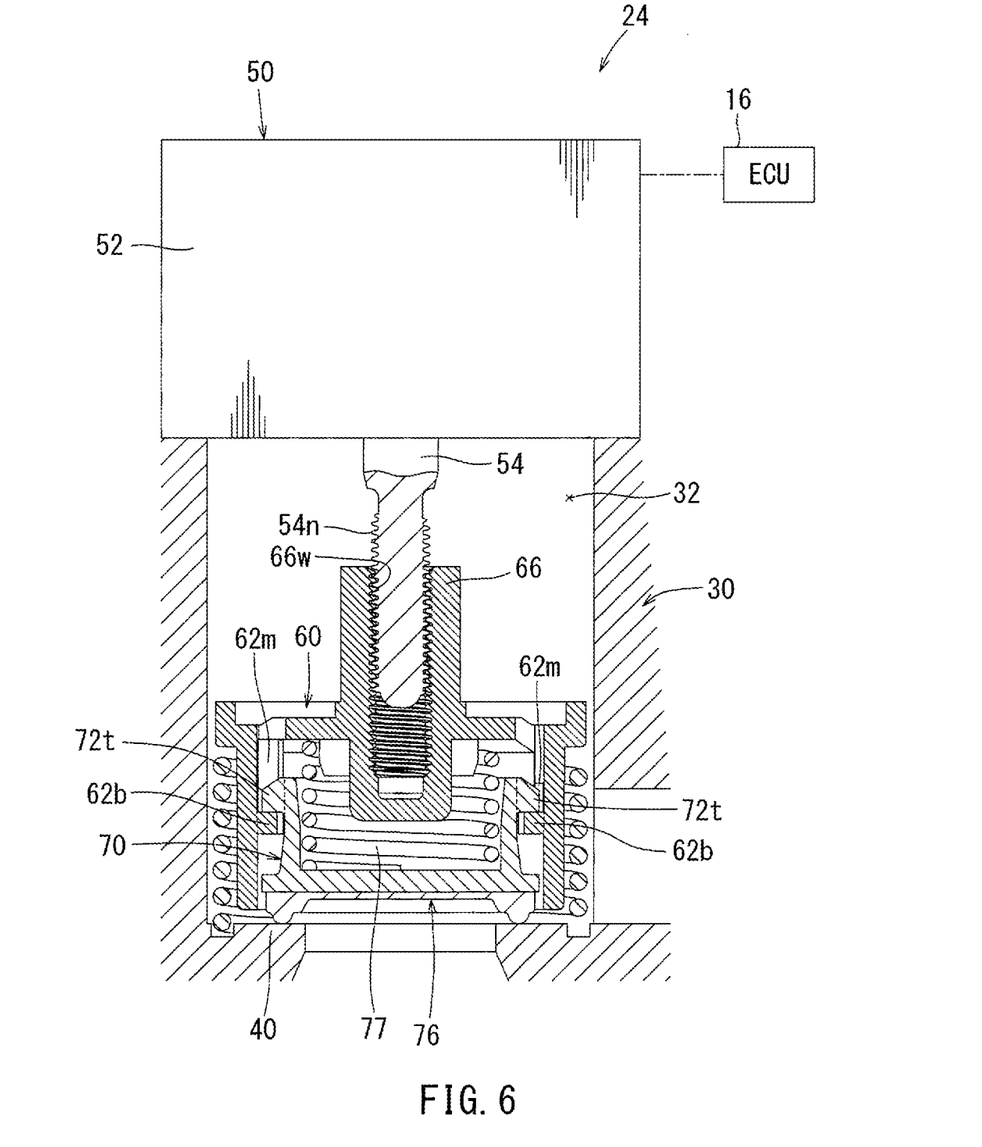
FIG. 6 is a vertical sectional view of the flow control valve similar to FIG. 5, which view illustrates a valve-closed condition.
Figure 7:
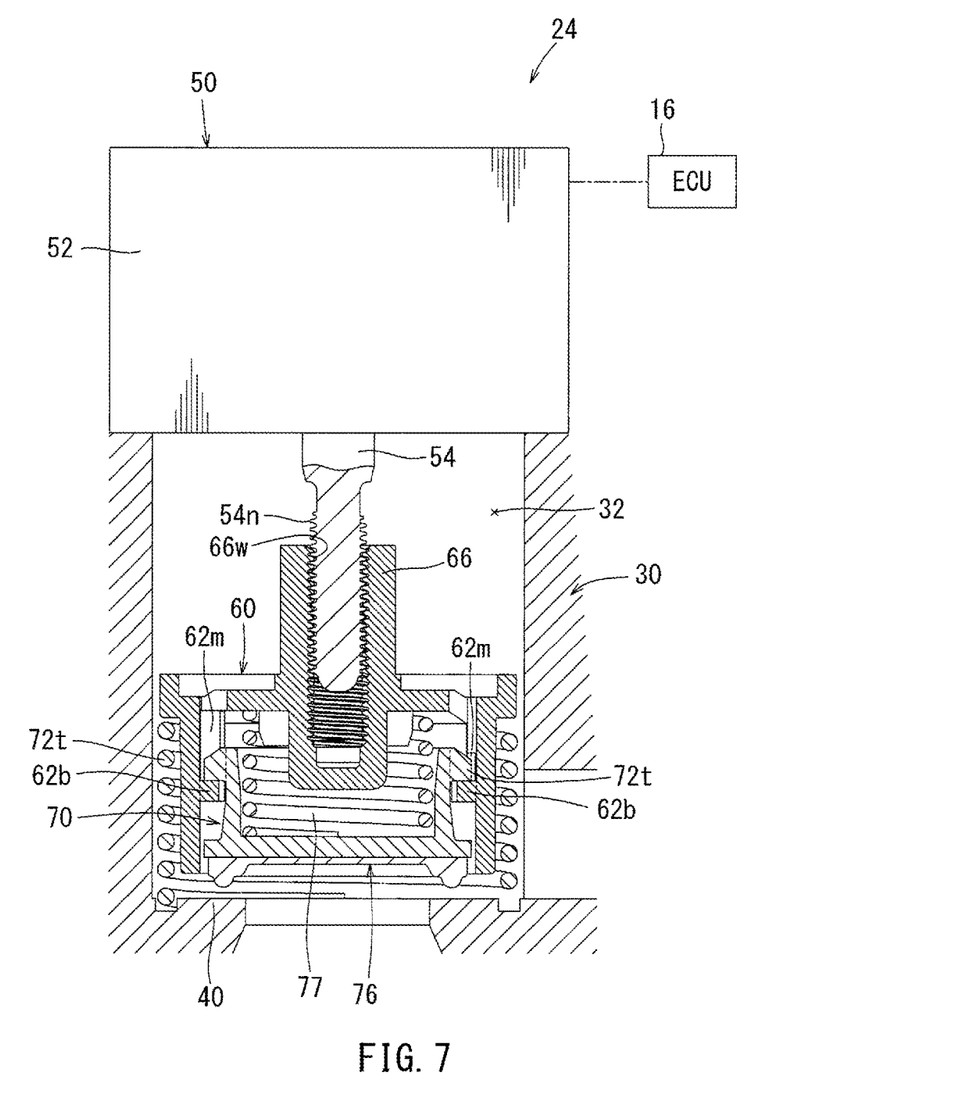
FIG. 7 is a vertical sectional view of the flow control valve similar to FIG. 5, which view illustrates a valve-opened condition.

When the stepping motor 50 further rotates in the valve-opening direction after the stepping motor 50 rotates by 4 steps, the valve guide 60 may move upward due to the threadable engagement of the male thread portion 54n and the female thread portion 66w. As a result, as shown in FIG. 6, the bottom wall portions 62b of the valve guide 60 may respectively contact the connecting projection portions 72t of the valve body 70 from below. Thereafter, when the valve guide 60 further moves upward, as shown in FIG. 7, the valve body 70 may move upward with the valve guide 60, the sealing member 76 of the valve body 70 may be spaced from the valve seat 40 of the valve casing 30. Thus, the closing valve 24 may reach the valve-opened condition.

Further, the valve-opening start position of the closing valve 24 may be individually varied due to a positional tolerance of the connecting projection portions 72t formed in the valve body 70, a positional tolerance of the bottom wall portions 62b of the valve guide 60 or other such factors. Therefore, the valve-opening start position has to be precisely learned. Such learning may be performed via a learning control. In the learning control, the stepping motor 50 of the closing valve 24 may be rotated in the valve-opening direction (i.e., the number of steps of the stepping motor 50 may be increased). Thereafter, when an inner pressure of the fuel tank 15 is reduced by a predetermined value or more, the number of steps corresponding to the valve-opening start position may be detected and stored.

Figure 8:
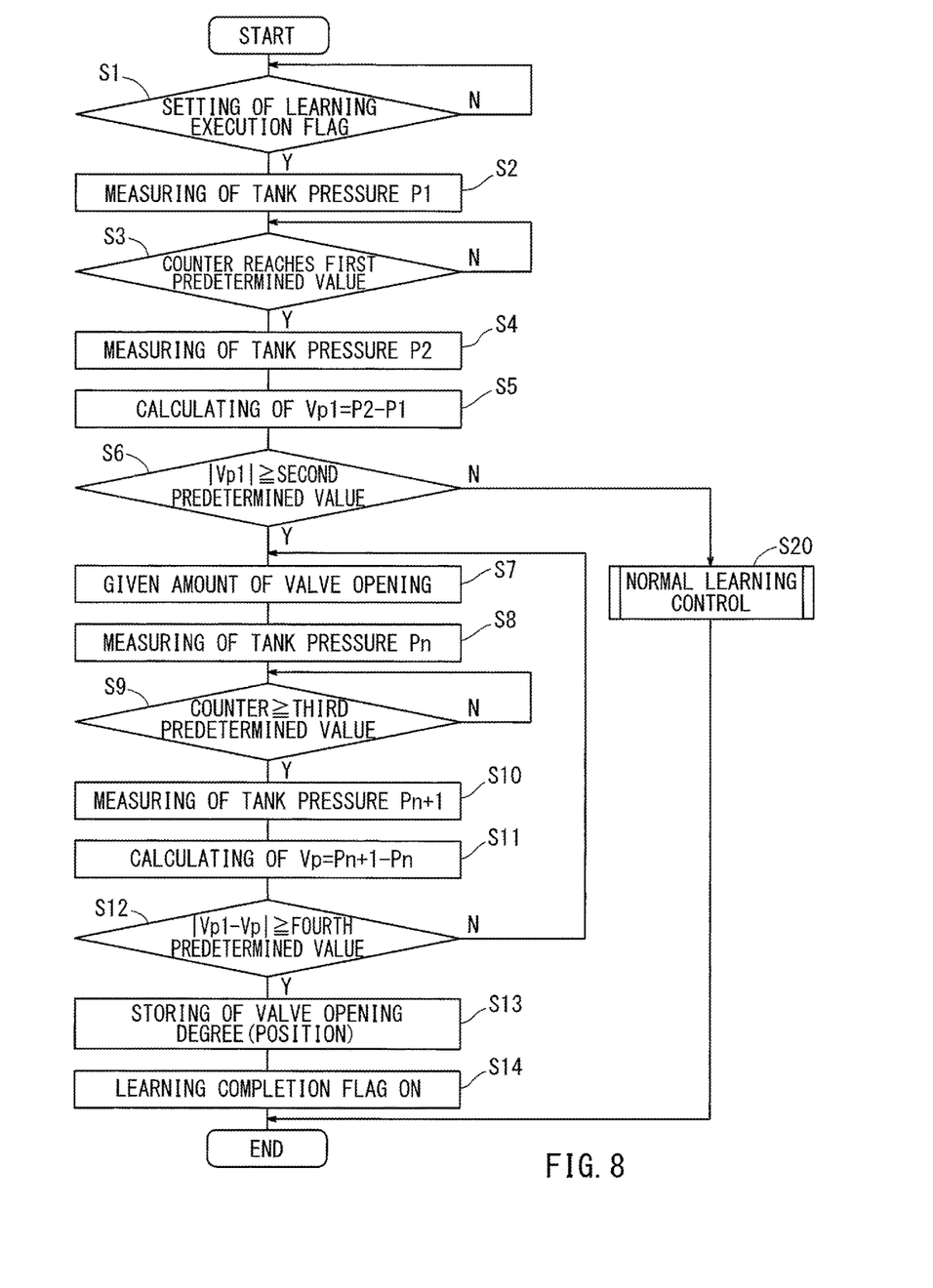
FIG. 8 is a flow chart of a learning control processing routine of a valve-opening start position of the flow control valve in the above-described first embodiment.

Next, a learning control processing routine for learning the valve-opening start position of the stepping motor driven closing valve 24, which routine may be performed in the control unit 16, will be described with reference to a flow chart of FIG. 8 and time charts of FIGS. 9 to 11. Upon execution of processing of the routine, in Step S1, an evaluation as to whether a learning execution flag is set or not may be performed. The learning execution flag may be set in a processing routine (not shown) under a condition suitable for executing the learning control of the valve-opening start position of the stepping motor driven closing valve 24. For example, the learning execution flag may be set when a power switch i.e., an ignition switch (not shown), of the vehicle is turned on while the vehicle is stopped. When the learning execution flag is set, the step S1 is affirmed, so that the learning control may be executed in Step S2 and following processing.

In Step S2, a fuel tank inner pressure (which may be hereinafter simply referred to as a tank pressure) P1 at that time may be measured by the inner pressure sensor 26 and stored. Next, in Step S3, an evaluation as to whether a time counter reaches a first predetermined value or not may be performed. When the counter reaches the first predetermined value after the elapse of a predetermined time, the step S3 may be affirmed. As a result, in Step S4 similar to Step S2, a tank pressure P2 at that time may be measured by the pressure sensor 26 and stored. Next, in Step S5, a differential pressure Vp1 between the tank pressures P1 and P2 stored as described above may be calculated. As will be apparent from FIG. 10, the differential pressure Vp1 calculated in the step may correspond to a variation per unit time of the tank pressure that is detected by the inner pressure sensor 26 under a condition in which the closing valve 24 is closed.

In Step S6, an evaluation as to whether an absolute value of the differential pressure Vp1 calculated at Step S5 is equal to or greater than a second predetermined value or not may be performed. The second predetermined value may correspond to a reference value for determining as to whether the tank pressure is in a stable condition or not.

Figure 9:
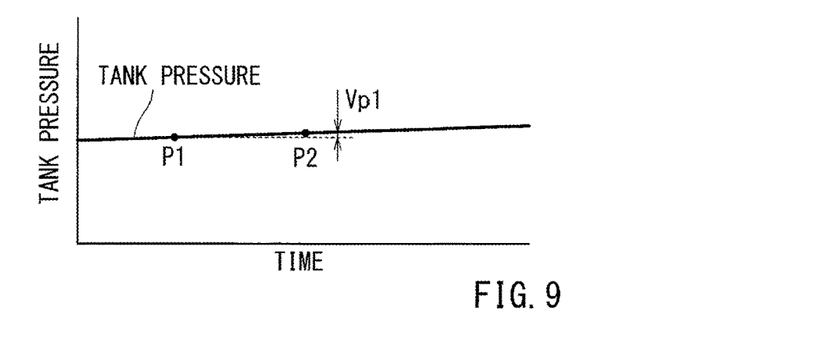
FIG. 9 is a time chart illustrating a situation in which a variation of a tank pressure is small in the above-describe first embodiment.

As shown in FIG. 9, when the absolute value of the differential pressure Vp1 is less than the second predetermined value, the step S6 is disaffirmed. Thus, a determination that the tank pressure is in the stable condition may be made, so that a normal learning control may be performed in step S20. In the normal learning control in Step S20, although details thereof are not shown in FIG. 8, when an amount of decrease of the tank pressure relative to a previous value is equal to or greater than a predetermined value, a determination that the closing valve 24 is in the valve-opening start position may be made, so that the position thereof may be stored as a learned value.

Figure 10:
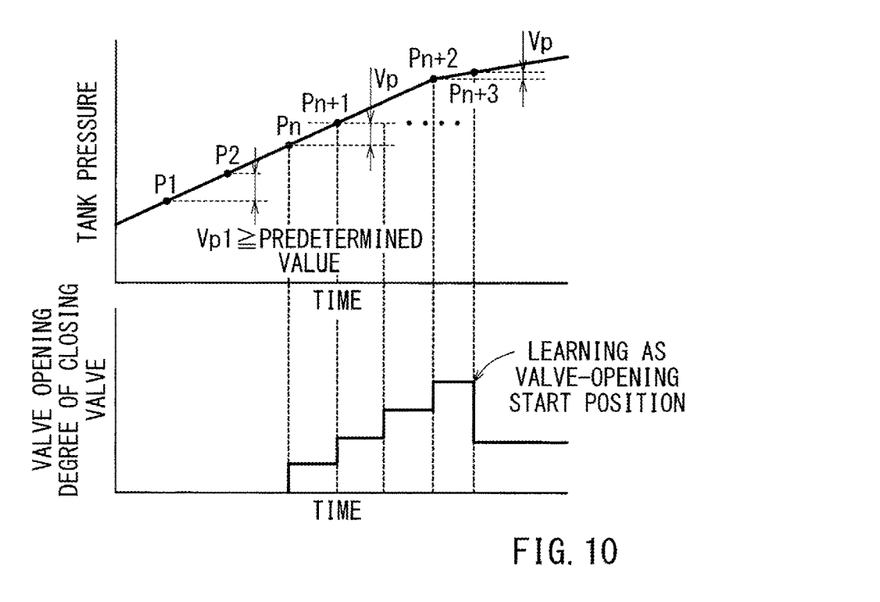
FIG. 10 is a time chart illustrating the variation of the tank pressure and a variation of opening degrees of the flow control valve when the tank pressure increases in the above-describe first embodiment.
Figure 11:
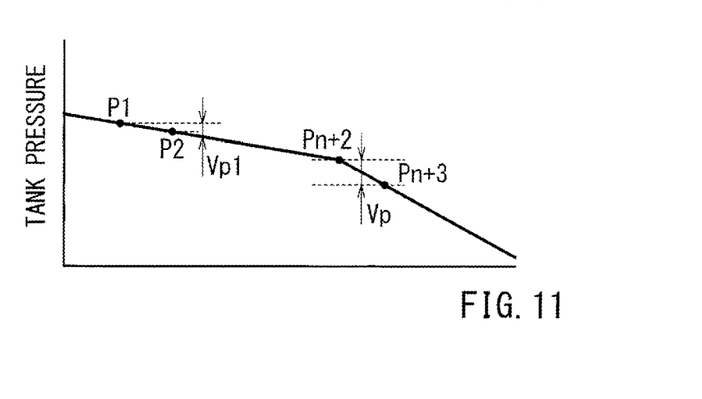
FIG. 11 is a time chart illustrating the variation of the tank pressure when the tank pressure decreases in the above-describe first embodiment.

Conversely, as shown in FIGS. 10 and 11, when the absolute value of the differential pressure Vp1 is equal to or greater than the second predetermined value, the step S6 may be affirmed, so that Step S7 and subsequent processing may be executed. As shown in FIG. 10, in Step S7, the closing valve 24 may be opened stepwise by a given amount by the stepping motor. During this period, in Step S8 similar to Step S2, a tank pressure Pn at that time may be measured by the inner pressure sensor 26 and stored. Further, in Step S9, an evaluation as to whether the time counter reaches a third predetermined value or not may be performed. When the counter reaches the third predetermined value after the elapse of a predetermined time, the step S9 may be affirmed. As a result, in Step S10 similar to Step S2, a tank pressure Pn+1 at the time may be measured by the pressure sensor 26 and stored. Next, in Step S11, a differential pressure Vp between the tank pressure Pn and the tank pressure Pn+1 stored as described above may be calculated. As will be apparent from FIG. 10, the differential pressure Vp calculated in this step may correspond to a variation per unit time of the tank pressure that is detected by the inner pressure sensor 26 after the valve opening operation of the closing valve 24 is started.

In Step S12, an evaluation as to whether an absolute value of a range of variation between the differential pressure Vp1 calculated at Step S5 and the differential pressure Vp calculated at Step S11 is equal to or greater than a fourth predetermined value or not may be performed. The fourth predetermined value may be set to a range of pressure variation corresponding to a condition in which the closing valve 24 reaches the valve-opening start position to communicate between the fuel tank 15 and as a consequence the canister 21 and the evaporated fuel starts to flow from the fuel tank 15 toward the canister 21 to reduce the fuel tank inner pressure. As shown in FIG. 10, at the time of the tank inner pressure Pn+1 and a tank pressure Pn+2, the range of variation of the differential pressure Vp relative to the differential pressure Vp1 may substantially be equal to zero, i.e., may not be equal to or greater than the fourth predetermined value. Therefore, Step S12 may be disaffirmed, so that Step S7 and subsequent processing may be executed. In a tank pressure Pn+3, the absolute value of the range of variation of the differential pressure Vp relative to the differential pressure Vp1 may be equal to or greater than the fourth predetermined value (the variation Vp per unit time of the tank pressure may be reduced by the fourth predetermined value or more relative to the differential pressure Vp1). Therefore, Step S12 may be affirmed, in Step S13, a valve opening position of the closing valve 24 at that time may be stored as the valve-opening start position. Actually, when the closing valve 24 is opened stepwise at the time of the tank pressure Pn+2, the sealing member 76 of the valve body 70 of the closing valve 24 may be spaced from the valve seat 40 of the valve casing 30, so that the closing valve 24 is opened. As a result, the fuel tank 15 may be communicated with the canister 21, so that an increasing rate of the tank may be reduced. When the learning control of the valve-opening start position of the closing valve 24 is thus completed, in Step S14, a learning completion flag may be set. That is, the above-described learning control processing routine cannot be performed until the above-described learning execution flag may be set again. Further, the processing in Step S5, Step S11 and Step S12 may correspond to calculating a second order differential value in the present disclosure. Further, the fourth predetermined value in the step S12 may correspond to a predetermined value of the present disclosure.

As shown in FIG. 11, under a condition in which the tank pressure decreases, when the closing valve 24 is opened and reaches the valve-opening start position at the time of the tank inner pressure Pn+3, the differential pressure Vp may further greatly reduce such that the absolute value of the range of variation of the differential pressure Vp relative to the differential pressure Vp1 may be equal to or greater than the fourth predetermined value (the variation Vp per unit time of the tank pressure may be increased by the fourth predetermined value or more relative to the differential pressure Vp1). As a result, the valve opening position of the closing valve 24 at that time may be stored as the valve-opening start position. In FIG. 11, although a time chart illustrating opening degrees of the flow control valve 24 is omitted, the closing valve 24 may be opened in the same manner as FIG. 10, so that the valve-opening start position may be determined at the time of the tank pressure Pn+3.

The learning control of the valve-opening start position of the closing valve 24 may be performed as described above. Therefore, when a valve-opening control of the closing valve 24 is performed, the closing valve 24 can be quickly opened from the valve-opening start position that is stored as the learned value. Further, in order to learn the valve-opening start position, a decrease in the inner pressure of the fuel tank caused by the start of flow of the evaporated fuel from the fuel tank 15 toward the canister 21 may be detected in consideration of a change of the inner pressure of the fuel tank under a condition in which the closing valve 24 is closed for learning. Therefore, the valve-opening start position may be accurately determined regardless of changes in environment of the fuel tank 15.

Figure 12:
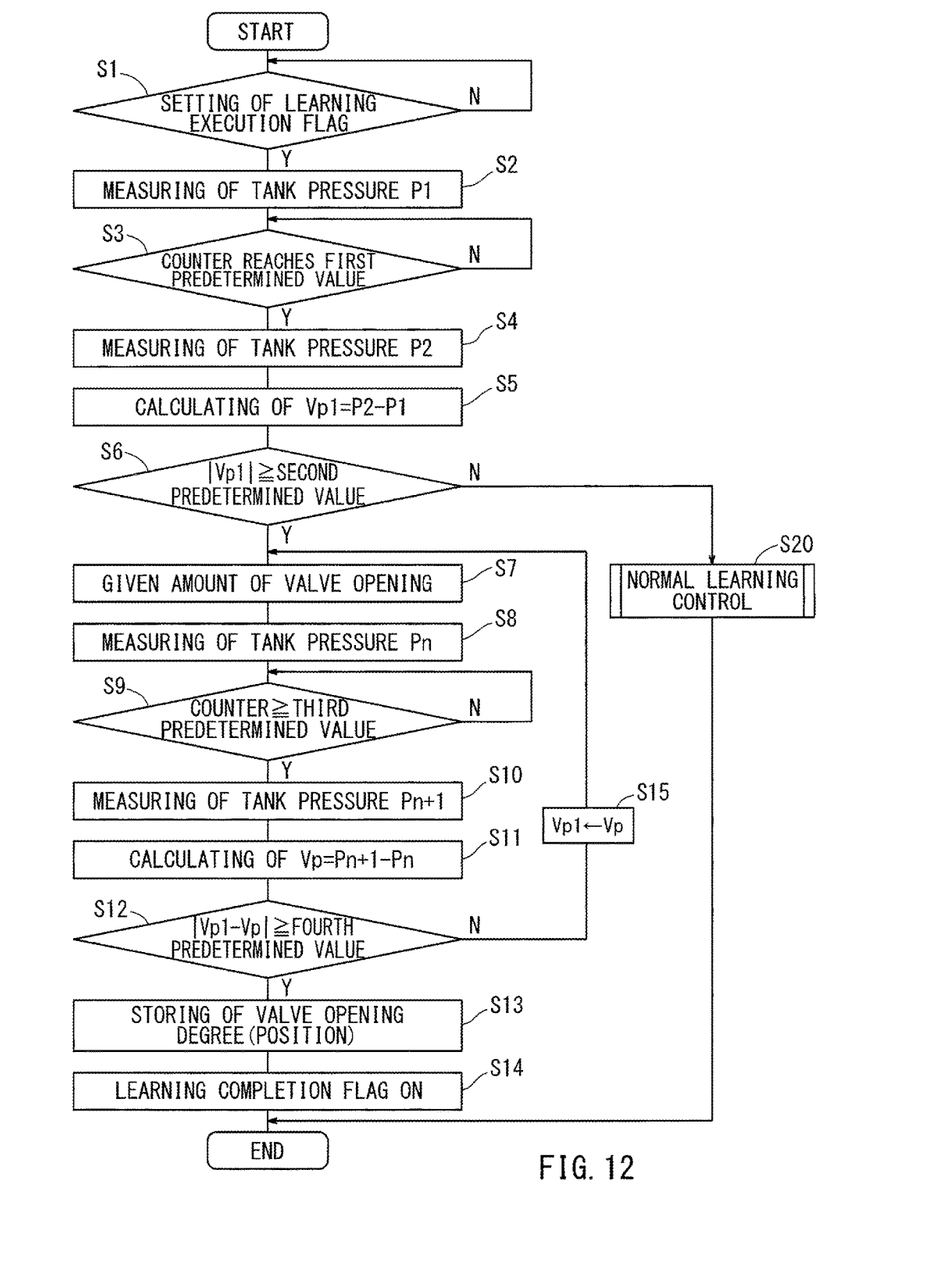
FIG. 12 is a flow chart of a learning control processing routine of a valve-opening start position of the flow control valve in a second embodiment of the present disclosure.

FIG. 12 shows a second embodiment of the present disclosure. The second embodiment is different from the first embodiment in a detection procedure of the change of the tank pressure that may occur when the closing valve 24 reaches the valve-opening start position. That is, in the first embodiment, in order to determine the valve-opening start position, the variation per unit time of the tank pressure after the valve opening operation of the closing valve 24 is started may be compared with the variation per unit time of the tank pressure under a condition in which the closing valve 24 is closed. To the contrary, in the second embodiment, in order to determine the valve-opening start position, the variation per unit time of the tank pressure may be periodically detected, so that a current value of the variation per unit time may be compared with a previous value of the variation per unit time. In particular, the processing routine shown in FIG. 12 may be different from the processing routine shown in FIG. 11 illustrating the first embodiment in that Step S15 is contained therein. Because the steps other than Step S15 are the same in the first embodiment, a detailed description of such steps may be omitted.

In Step S15 shown in FIG. 12, the differential pressure Vp calculated in Step S11 may be replaced with the differential pressure Vp1 that may be used as a reference value in Step S12. Therefore, when the range of variation between the differential pressure Vp1 and the differential pressure Vp is calculated and compared with the fourth predetermined value in Step S12 again, an evaluation as to whether an absolute value of the range of variation between the differential pressure Vp calculated this time and the differential pressure Vp calculated previous time is equal to or greater than a fourth predetermined value or not may be performed.

According to the second embodiment, the valve-opening start position of the closing valve 24 may be determined based on the range of variation between the differential pressure Vp calculated this time and the differential pressure Vp calculated previous time. Therefore, even if the tank pressure gradually varies due to external factors such as changes in temperature, the valve-opening start position can be determined without any influence.

Furthermore, in the second embodiment, the processing in Steps S2 to Step S6 and Step S20 may be omitted. This omission may contribute to reduce a processing program for determination of the valve-opening start position of the closing valve 24, so as to reduce a processing time.

The processing Step S2 to Step S5 and Step S8 to Step S12 in each of the embodiments described above may correspond to a valve-opening start position determination means of the first aspect of the present disclosure. Further, the processing Step S2 to Step S5 may correspond to a first inner pressure variation calculating means of the present invention. Further, the processing in Step S8 to Step S11 may correspond to a second inner pressure variation calculating means of the present disclosure. Further, the processing in Step S8 to Step S11 and Step S15 may correspond to a third inner pressure variation calculating means of the present disclosure. Further, the processing in Step S12 may correspond to a valve-opening start position determination means of the second and third aspects of the present disclosure. Further, the processing in Step S13 may correspond to a learning means of the present disclosure. Further, the processing in Steps S6 and Step S20 may correspond to a valve-opening start position determination means of the sixth aspect of the present disclosure.

A particular embodiment has been described. However, the embodiment may not be limited to the special structure described above. Therefore, various changes, additions and deletions may be made to the embodiment of the present disclosure without departing from the sprit and the object of the disclosure. For example, in the embodiment described above, the stepping motor driven closing valve 24 is used as the flow control valve. However, the closing valve 24 may be replaced with a ball valve in which valve opening degrees thereof may be continuously changed due to rotation of a ball-shaped valve element. Further, in the embodiment described above, the present disclosure is applied to the engine system of the vehicle. However, the disclosure may be applied to an engine system other than the vehicle. Further, the engine system of the vehicle may be an engine system of a hybrid vehicle in which an engine and a motor are used in conjunction with each other.

The invention claimed is:

1. An evaporated fuel processing device, comprising:
 a fuel tank;
 a canister including an adsorbent material configured to adsorb evaporated fuel;
 a vapor conduit coupled to the fuel tank and the canister and configured to provide evaporated fuel from the fuel tank to the canister;
 a flow control valve disposed along the vapor conduit, wherein the flow control valve has a closed position in which fluid communication between the canister and the fuel tank is prevented along the vapor conduit, and wherein the flow control valve has an open position in which the canister is in fluid communication with the fuel tank along the vapor conduit;
 an pressure sensor configured to detect a pressure within the fuel tank; and
 a control unit coupled to the flow control valve and the pressure sensor, wherein the control unit is configured to:
  calculate a second order differential value of the inner pressure within the fuel tank detected by the inner pressure sensor;
  determine a valve opening position of the flow control valve as a valve-opening start position when the second order differential value is equal to or greater than a predetermined value; and
  store the determined valve-opening start position determined by the valve-opening start position that is used when a valve opening control of the flow control valve is performed.

2. An evaporated fuel processing device, comprising:
 a fuel tank;
 a canister including an adsorbent material configured to adsorb evaporated;

a vapor conduit coupled to the fuel tank and the canister and configured to provide evaporated fuel from the fuel tank to the canister;

a flow control valve disposed along the vapor conduit, wherein the flow control valve has a closed position in which fluid communication between the canister and the fuel tank is prevented along the vapor conduit, and wherein the flow control valve has an open position in which the canister is in fluid communication with the fuel tank along the vapor conduit;

a pressure sensor configured to detect a pressure within the fuel tank; and a control unit coupled to the flow control valve and the pressure sensor, wherein the control unit is configured to:

calculate a first variation per unit time of the pressure within the fuel tank detected by the pressure sensor, when the flow control valve is in the closed position;

calculate a second variation per unit time of the pressure within the fuel tank detected by the pressure sensor after a valve opening operation of the flow control valve is started;

determine a valve opening position of the flow control valve as a valve-opening start position when a difference between the first variation and the second variation is equal to or greater than a predetermined value; and store the determined valve-opening start position as a learned value that is used when a valve-opening control of the flow control valve is performed.

3. An evaporated fuel processing device, comprising:

a fuel tank;

a canister including an adsorbent material configured to adsorb evaporated fuel;

a vapor conduit coupled to the fuel tank and the canister and configured to provide configured to provide evaporated fuel from the fuel tank to the canister;

a flow control valve disposed along the vapor conduit, wherein the flow control valve has a closed position in which fluid communication between the canister and the fuel tank is prevented along the vapor conduit, and wherein the flow control valve has an open position in which the canister is in fluid communication with the fuel tank along the vapor conduit;

a pressure sensor configured to detect a pressure within the fuel tank as; and a control unit configured to:

calculate a variation per unit time of the pressure within the fuel tank detected by the pressure sensor;

determine a valve-opening position of the flow control valve as a valve-opening start position when a difference between a previous value and a present value of the variation is equal to or greater than a predetermined value; and store the determined valve-opening start position as a learned value that is used when a valve opening control of the flow control valve is performed.

4. The evaporated fuel processing device of claim 2, wherein the control unit is configured to determine the valve opening position of the flow control valve as the valve-opening start position when the second variation is less than the first variation by an amount greater than or equal to the predetermined value under a condition in which the first variation is increased.

5. The evaporated fuel processing device of claim 2, wherein the control unit is configured to determine the valve opening position of the flow control valve as the valve-opening start position when the second variation is greater than the first variation by an amount greater than or equal to the predetermined value under a condition in which the first variation is reduced.

6. The evaporated fuel processing device of claim 2, wherein the control unit is configured to:

determine whether the first variation is less than a reference value;

determine that the pressure within the fuel tank is in a stable condition if the first variation is less than the reference value; and determine the valve-opening start position based on whether a variation per unit time of the pressure within the fuel tank detected by the pressure sensor is equal to or greater than the predetermined value or not.

7. The evaporated fuel processing device of claim 3, wherein the control unit is configured to determine the valve opening position of the flow control valve as the valve-opening start position when the present value of the variation is less than the previous value of the variation by an amount greater than or equal to the predetermined value under a condition in which the previous value of the variation is increased.

8. The evaporated fuel processing device of claim 3, wherein the control unit is configured to determine the valve opening position of the flow control valve as the valve-opening start position when the present value of the variation is greater than the previous value of the variation by an amount greater than or equal to the predetermined value under a condition in which the previous value of the variation is reduced.

* * * * *

UNITED STATES PATENT AND TRADEMARK OFFICE
CERTIFICATE OF CORRECTION

PATENT NO. : 10,267,267 B2
APPLICATION NO. : 15/507789
DATED : April 23, 2019
INVENTOR(S) : Junya Kimoto and Yoshikazu Miyabe It is certified that error appears in the above-identified patent and that said Letters Patent is hereby corrected as shown below:

In the Claims

Claim 1, Column 12, Lines 53-55, the phrase "calculate a second order differential value of the inner pressure within the fuel tank detected by the inner pressure sensor" should instead be changed to -- calculate a second order differential value of the pressure within the fuel tank detected by the pressure sensor. --

Claim 1, Column 12, Lines 60-63, the phrase "store the determined valve-opening start position determined by the valve-opening start position that is used when a valve opening control of the flow control valve is performed" should instead be changed to -- store the determined valve-opening start position as a learned value that is used when a valve opening control of the flow control valve is performed. --

Claim 2, Column 12, Lines 66 and 67, the phrase "a canister including an adsorbent material configured to adsorb evaporated" should be changed to -- a canister including an adsorbent material configured to adsorb evaporated fuel. --

Claim 3, Column 13, Lines 45-47, the phrase "a pressure sensor configured to detect a pressure within the fuel tank as" should be changed to -- a pressure sensor configured to detect a pressure within the fuel tank. --

Signed and Sealed this
Twenty-seventh Day of August, 2019

Andrei Iancu
*Director of the United States Patent and Trademark Office*